United States Patent [19]

Wikner

[11] 4,064,762
[45] Dec. 27, 1977

[54] METHOD AND APPARATUS FOR BALANCING A ROTOR

[75] Inventor: Jan Christer Wikner, Finspong, Sweden

[73] Assignee: Stal-Laval Turbin AB, Finspong, Sweden

[21] Appl. No.: 677,651

[22] Filed: Apr. 16, 1976

[30] Foreign Application Priority Data

Apr. 28, 1975 Sweden .................. 7504871

[51] Int. Cl.² .............. B25B 19/00; G01M 1/32
[52] U.S. Cl. ...................... 73/487; 29/255; 29/275; 81/52.35
[58] Field of Search ............. 73/487; 29/254, 255, 29/275; 81/52.35, 53.2; 301/5 B

[56] References Cited

U.S. PATENT DOCUMENTS

| 1,746,326 | 2/1930 | Tomkinson | 29/275 |
| 1,769,591 | 7/1930 | McIntosh | 29/275 |
| 2,488,001 | 11/1949 | Birk | 29/275 |
| 2,743,837 | 5/1956 | Cook | 29/275 |
| 3,152,391 | 10/1964 | Bjorn et al. | 29/254 |
| 3,519,087 | 7/1970 | Santi | 29/254 |
| 3,769,682 | 11/1973 | Carver | 29/255 |

Primary Examiner—Herbert Goldstein
Attorney, Agent, or Firm—Pollock, Vande Sande & Priddy

[57] ABSTRACT

A tool for inserting balance weights in a rotatable body such as a turbine rotor includes an elongated insertion rod having structure such as threads at one end for attachment to a balance weight. An elongated sleeve slideably surrounds the insertion rod and includes on one end a surface conformed to strike the balance weight when the sleeve is moved on the rod. By striking one end of the sleeve, the balance weight may be upset into a recess in the rotor. A method of using the tool is also disclosed.

2 Claims, 3 Drawing Figures

METHOD AND APPARATUS FOR BALANCING A ROTOR

BACKGROUND OF THE INVENTION

In large rotating machinery such as turbine generators, it is common practice to carefully balance the shaft and rotor elements of the generator prior to mounting them in a stator, in order to minimize vibration and whirl during operation. Nonetheless, it is frequently necessary to perform a final balancing of the machine once it has been installed at its location of intended use. To facilitate such final balancing operations, prior art rotating machinery usually includes small, capped inspection openings through which balance weights may be inserted into recesses already machined in the rotor for this purpose. Specifically, it is known to place a balance weight at the end of a long rod which is frequently screwed into the weight. The weight is then inserted into a recess in the rotor and the rod is struck as necessary to upset the material of the balance weight so that it will remain in the recess. In this type of balancing, it is frequently difficult to remove the rod from the weight following the upsetting; moreover, the rod itself is rendered useless fairly rapidly due to the repeated blows required for upsetting the material of the balanced weight.

OBJECTS OF THE INVENTION

An object of this invention is to provide a tool for inserting balance weights which is easily removed following upsetting of the balance weight.

Another object of the invention is to provide such a tool in which the insertion rod is not struck to upset the material of the balance weight.

Another object of the invention is to provide such a tool which is of simple, rugged construction adapted for frequent use without the excessive wear of the insertion rod experienced with prior art devices.

These objects of the invention are given only by way of example; thus, other desirable objects and advantages inherently achieved by the disclosed structure may occur to those skilled in the art. Nonetheless, the invention provides certain distinct advantages as will be apparent from the following description.

DETAILED DESCRIPTION OF A PREFERRED EMBODIMENT

Figure 1:
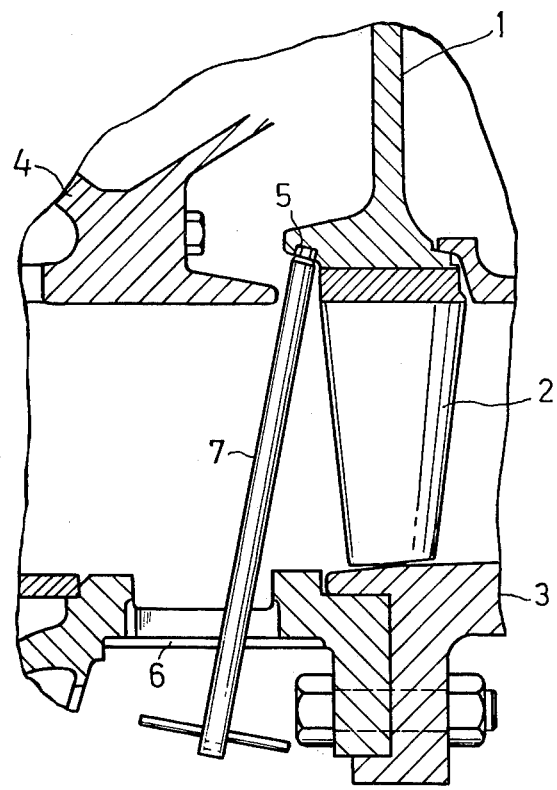
FIG. 1 shows a fragmentary view of a turbine indicating the mode of insertion of the tool according to the invention through an access port of the turbine housing.

There follows a detailed description of a preferred embodiment of the invention, reference being had to the drawing in which like reference numerals identify like elements of structure in each of the several figures.

FIG. 1 shows a fragmentary view of a rotating machine such as a turbine generator which includes a rotor disc 1 having rotor blades 2 mounted on the periphery thereof. The stator of the machine includes an outer portion 3 and an inner portion 4. Along the circumferential edge of rotor disc 1 is located a dove-tail groove 5 in which balance weights may be placed when needed, as shown more clearly in FIGS. 2 and 3. In order to provide access to the rotor, an opening 6 is provided in the outer portion 3 of the stator which is ordinarily closed by some sort of a lid or cover when the balancing operation has been completed. A tool 7 of the type shown in FIGS. 2 and 3 may be inserted through opening 6 as indicated.

In use, any unbalance in the rotor is measured by a known technique of synchronized vibration measurement, thus providing an indication of the correct position for installation of a balance weight. When the proper portion of the rotor has been correctly rotated into registry with opening 6, tool 7 and a balance weight are inserted and the balance weight is fixed within dove-tail groove 5.

Figure 2:
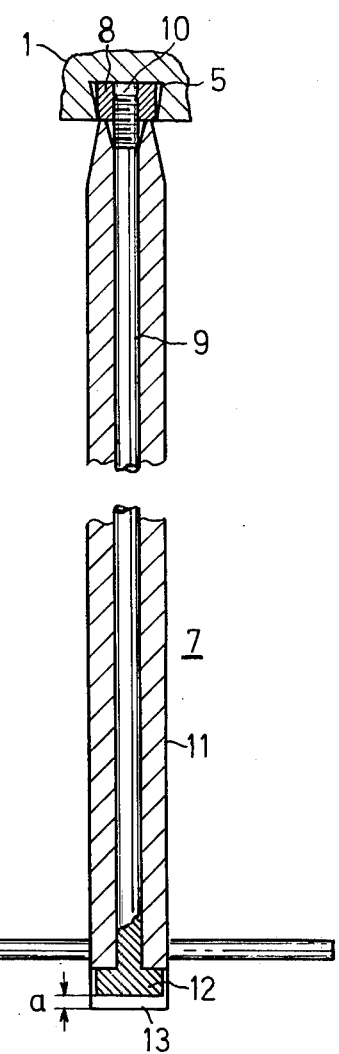
FIG. 2 shows a longitudinal, partially sectional view of the tool according to the invention and a portion of the turbine rotor, indicating the cooperation of the various parts of the tool.
Figure 3:
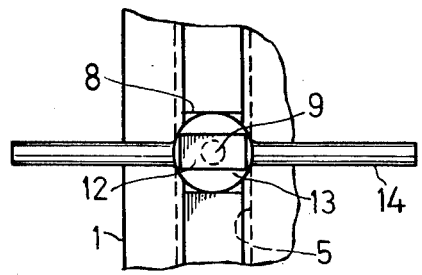
FIG. 3 shows an end view of the tool according to the invention, indicating the unique structure provided for removing the insertion rod from a balancing weight.

FIGS. 2 and 3 show a balance weight 8 attached to one end of tool 7, the weight having been inserted in dove-tail groove 5. Balance weight 8 is preferably provided with parallel sides to facilitate insertion into dove-tail groove 5. Weight 8 is preferably made from material such as soft-annealed copper, which has a good specific weight and is easily upset. Soft-annealed copper also work hardens sufficiently so that it remains on the tool during the upsetting operation and within dove-tail groove 5 after the upsetting has been completed.

Balance weight 8 is provided with a threaded hole 10 for attaching the weight to a threaded end of an elongated rigid insertion rod or core 9 located in tool 7. In this manner, an adequate attachment of the balance weights to the tool is insured so that there is a minimal risk of dropping a balance weight into the machine which could necessitate a total dismantling of the machine to remove a dropped weight. Insertion rod 9 is surrounded by a rigid sleeve 11. The end of sleeve 11 adjacent balance weight 8 is tapered as indicated to provide a contact surface for transmitting force from sleeve 11 to balance weight 8. The length of insertion rod 9 and sleeve 11 are suitably chosen so that sleeve 11 extends beyond the other end of insertion rod 9 by a distance "$a$" when a balance weight 8 has been screwed onto insertion rod 9, as seen in FIG. 2. This distance is chosen so that it corresponds approximately to the required travel of sleeve 11 to obtain the necessary upsetting of balance weight 8. In use, sleeve 11 is struck, as with a hammer, so that its tapered end forces balance weight 8 into tapered groove 5, as sleeve 11 slides along the length of insertion rod 9. When sleeve 11 has traveled the distance "$a$", the ends of sleeve 11 and insertion rod 9 become essentially co-planar, thereby giving the user an indication that the upsetting operation has been satisfactorily completed.

To facilitate the removal of insertion rod 9 from balance weight 8, rod 9 is provided with a transverse head 12 which is slideably received in axially extending, radial grooves 13 located at the outer end of sleeve 11. When the upsetting operation has been completed, sleeve 11 is rotated using handles 14, thereby withdrawing insertion rod 9 from balance weight 8.

Having described my invention in sufficient detail to enable those skilled in the art to make and use it, I claim:

1. A method of balancing a rotor comprising the steps of:

removably attaching a balance weight to one end of an insertion rod, said insertion rod being slideably received in a sleeve, said sleeve bearing on said balance weight and extending beyond the other end of said insertion rod a predetermined distance;

inserting said balance weight into a recess in said rotor at a preselected location therein;

striking said sleeve against said balance weight to upset the material of said balance weight into said recess;

visually observing movement of said sleeve along said insertion rod until said sleeve has moved through said predetermined distance and the ends of said sleeve and said insertion rod are aligned to obtain a desired upsetting of said balance weight and then stopping said striking; and removing said insertion rod from said balance weight, leaving said balance weight in said recess.

2. A tool for positioning a balance weight in a rotor, comprising:

an elongated insertion rod having means at one end thereof for removable attachment to a balance weight;

an elongated sleeve having a through bore slideably surrounding said insertion rod, one end of said elongated sleeve being adapted to strike a balance weight attached to said insertion rod, when said elongated sleeve moves along said insertion rod; said elongated sleeve extending beyond the other end of said insertion rod by a distance corresponding to the movement of said elongated sleeve along said insertion rod required to upset a balance weight;

whereby said insertion rod is not contacted when said elongated sleeve is struck and substantial alignment of the other end of said insertion rod and the other end of said elongated sleeve provides a visual indication to a user of the tool that said elongated sleeve has moved said distance required to upset a balance weight.

* * * * *